(12) United States Patent
Brombach et al.

(10) Patent No.: US 11,427,103 B2
(45) Date of Patent: Aug. 30, 2022

(54) METHOD FOR OPERATING A CHARGING STATION

(71) Applicant: Wobben Properties GmbH, Aurich (DE)

(72) Inventors: Johannes Brombach, Berlin (DE); Christian Strafiel, Aurich (DE); Tobias Pingel, Esens (DE)

(73) Assignee: Wobben Properties GmbH, Aurich (DE)

( * ) Notice: Subject to any disclaimer, the term of this patent is extended or adjusted under 35 U.S.C. 154(b) by 307 days.

(21) Appl. No.: 16/606,198

(22) PCT Filed: Apr. 20, 2018

(86) PCT No.: PCT/EP2018/060188
§ 371 (c)(1),
(2) Date: Oct. 17, 2019

(87) PCT Pub. No.: WO2018/193091
PCT Pub. Date: Oct. 25, 2018

(65) Prior Publication Data
US 2020/0130527 A1 Apr. 30, 2020

(30) Foreign Application Priority Data

Apr. 21, 2017 (DE) .................... 10 2017 108 579.3

(51) Int. Cl.
*B60L 53/63* (2019.01)
*B60L 53/54* (2019.01)
(Continued)

(52) U.S. Cl.
CPC ............... *B60L 53/63* (2019.02); *B60L 53/52* (2019.02); *B60L 53/54* (2019.02); *B60L 53/67* (2019.02);
(Continued)

(58) Field of Classification Search
CPC ....................................................... B60L 53/63
(Continued)

(56) References Cited

U.S. PATENT DOCUMENTS

| 8,509,976 B2 | 8/2013 | Kempton |
| 8,779,720 B2 * | 7/2014 | Gaul ........................ H02J 3/241 320/109 |

(Continued)

FOREIGN PATENT DOCUMENTS

| DE | 102010030093 A1 | 12/2010 |
| DE | 102009038033 A1 | 2/2011 |

(Continued)

*Primary Examiner* — Jerry D Robbins
(74) *Attorney, Agent, or Firm* — Seed Intellectual Property Law Group LLP

(57) ABSTRACT

A method for operating a charging station for charging a plurality of electric vehicles, in particular electric cars, wherein the charging station is connected at a grid connection point to an electrical supply grid in order to be supplied with electrical energy from the electrical supply grid via said grid connection point, comprising the steps of drawing electrical energy from the electrical supply grid and charging one or more electric vehicles using the electrical energy drawn from the electrical supply grid, wherein the charging station is controlled in such a way that the electrical supply grid is electrically supported.

18 Claims, 4 Drawing Sheets

(51) Int. Cl.
  *B60L 53/67* (2019.01)
  *B60L 53/52* (2019.01)
  *H02J 7/00* (2006.01)
  *H02J 7/34* (2006.01)
  *H02J 15/00* (2006.01)

(52) U.S. Cl.
  CPC ............ *H02J 7/00712* (2020.01); *H02J 7/34* (2013.01); *H02J 15/00* (2013.01); *B60L 2210/30* (2013.01); *B60L 2210/42* (2013.01)

(58) Field of Classification Search
  USPC ....................................................... 320/109
  See application file for complete search history.

(56) References Cited

U.S. PATENT DOCUMENTS

| | | | |
|---|---|---|---|
| 8,981,708 B2* | 3/2015 | Diedrichs | B60L 53/63 320/101 |
| 9,045,048 B2 | 6/2015 | Yukizane et al. | |
| 10,137,796 B2* | 11/2018 | Huang | B60L 58/10 |
| 10,520,966 B2 | 12/2019 | Veda et al. | |
| 2010/0039062 A1* | 2/2010 | Gu | B60L 53/67 320/101 |
| 2010/0230292 A1* | 9/2010 | Kelly | H02S 40/44 205/338 |
| 2011/0015799 A1* | 1/2011 | Pollack | H02J 7/0071 700/291 |
| 2011/0245987 A1 | 10/2011 | Pratt et al. | |
| 2012/0280655 A1 | 11/2012 | Schneider et al. | |
| 2013/0057211 A1* | 3/2013 | Kuribayashi | B60L 53/65 320/109 |
| 2014/0176051 A1 | 6/2014 | Hayashi et al. | |
| 2014/0347018 A1 | 11/2014 | Boblett et al. | |
| 2015/0015213 A1* | 1/2015 | Brooks | B60L 53/18 320/137 |
| 2015/0061569 A1 | 3/2015 | Alexander et al. | |
| 2015/0255985 A1* | 9/2015 | Higashi | B60L 53/67 700/297 |
| 2015/0256003 A1 | 9/2015 | Yonetani | |
| 2015/0328999 A1 | 11/2015 | Dureau et al. | |
| 2016/0091912 A1 | 3/2016 | Stanlake | |
| 2016/0214499 A1 | 7/2016 | Spesser et al. | |
| 2016/0236584 A1* | 8/2016 | Miftakhov | B60L 53/68 |
| 2017/0005515 A1 | 1/2017 | Sanders et al. | |
| 2017/0302107 A1* | 10/2017 | Saussele | H02J 13/0003 |
| 2017/0317521 A1 | 11/2017 | Anderlohr et al. | |
| 2018/0215279 A1 | 8/2018 | Beekmann | |
| 2019/0020198 A1 | 1/2019 | Beekmann | |
| 2020/0023747 A1* | 1/2020 | Logvinov | B60L 53/66 |

FOREIGN PATENT DOCUMENTS

| | | |
|---|---|---|
| DE | 102009050042 A1 | 2/2011 |
| DE | 102009043380 A1 | 4/2011 |
| DE | 102009046422 A1 | 5/2011 |
| DE | 102010036087 A1 | 3/2012 |
| DE | 102010062362 A1 | 6/2012 |
| DE | 102014221555 A1 | 4/2016 |
| DE | 102015101041 A1 | 7/2016 |
| DE | 102015112752 A1 | 2/2017 |
| DE | 102015114704 A1 | 3/2017 |
| EP | 2634889 A1 | 9/2013 |
| EP | 2647522 A1 | 10/2013 |
| EP | 2875985 A1 | 5/2015 |
| EP | 2875986 A1 | 5/2015 |
| EP | 2983264 A1 | 2/2016 |
| EP | 3002848 A1 | 4/2016 |
| JP | H08140285 A | 5/1996 |
| JP | 2008141926 A | 6/2008 |
| JP | 2009213240 A | 9/2009 |
| JP | 2011091979 A | 5/2011 |
| JP | 2013031243 A | 2/2013 |
| JP | 2014063492 A | 4/2014 |
| JP | 2014099958 A | 5/2014 |
| JP | 2015039289 A | 2/2015 |
| JP | 2017518725 A | 7/2017 |
| KR | 10-2013-0006453 A | 1/2013 |
| WO | 2011/020831 A2 | 2/2011 |
| WO | 2013008429 A1 | 1/2013 |
| WO | 2013031073 A1 | 3/2013 |
| WO | 2011118187 A1 | 7/2013 |
| WO | 2015/196193 A1 | 12/2015 |
| WO | 2017/021488 A1 | 2/2017 |

* cited by examiner

METHOD FOR OPERATING A CHARGING STATION

BACKGROUND

Technical Field

The present invention relates to a method for operating a charging station for charging a plurality of electric vehicles, in particular for charging a plurality of electric cars. The present invention furthermore relates to a charging station of this type.

Description of the Related Art

Due to an increasing number of electric vehicles, in particular electric cars, the need also exists to provide corresponding charging stations. In order to be able to charge electric cars, in particular, on the move also, charging stations will be required in the same way as filling stations for combustion fuels today. In this respect, the term "electric filling station" can also be used for a charging station of this type.

A plurality of vehicles are therefore charged simultaneously in charging stations of this type and the drivers of the electric vehicles normally expect this charging to be carried out as quickly as possible so that they do not have to linger too long at the charging station. However, this causes the problem that a correspondingly large amount of energy also needs to be fed to the electric vehicles in the shortest possible time.

Along with a specific control of each charging procedure and also a specific control of the distribution at the charging station to the individual vehicles to be charged in each case, the problem also arises of feeding the energy to the charging station.

Corresponding connections to an electrical supply grid can be provided for this purpose. A connection of this type is referred to here as a grid connection point of the respective charging station. It should be noted that charging stations of this type are often set up comparatively locally in the country, for example on a highway. Charging stations of this type can therefore normally also be set up locally in relation to a topology of the electrical supply grid concerned. This can cause the problem that line capacities for providing the required charging power are limited. Sometimes a charging station is efficiently operable for a plurality of vehicles only if a large number of vehicles can be charged.

In order to tackle this problem, a corresponding expansion of the electrical supply grid can be provided in order to create the respectively required line capacities for the charging stations. Sometimes, however, an expansion of this type can be very expensive. Along with the costs for the construction or modification of connection lines of this type, corresponding approval procedures are also involved. Such an increase in line capacity can furthermore or therefore also delay the construction of a charging station of this type. This can then even result in the general failure of the construction of a corresponding charging station.

Alternatively, an attempt can be made to set up charging stations essentially only at locations where correspondingly high line capacities are present. However, this conflicts with a concept according to which charging stations of this type should be planned to be as consistent as possible or as focused as possible on the needs of the electric vehicles to be charged.

In any case, it must also be taken into account that a charging station of this type has an impact on the electrical supply grid. In particular, a charging station of this type can also have the problem that it does not require power very consistently to charge the vehicles, but rather sometimes has load peaks. Such load peaks may occur as distributed not only over the day, but also distributed over the year, and may also be situation-dependent, as, for example, in the case of traffic congestion or an accident on a highway on which the charging station concerned is operated. Not only can the power delivery from the electrical supply grid to the charging station concerned therefore be a problem, but also the load emanating from the charging station onto the electrical supply grid.

A charging device is known from U.S. Pat. No. 8,981,708 which can charge electric storage devices of electric vehicles from the AC voltage grid and can feed into the AC voltage grid.

In the priority application for the present application, the German Patent and Trade Mark Office has furthermore identified the following prior art: DE 10 2009 050 042 A1, DE 10 2014 221 555 A1; DE 10 2015 114 704 A1 and WO 2017/021488 A1.

BRIEF SUMMARY

Provided is a method that enables the connection of charging stations in a simple manner and designs this connection to be grid-compatible.

A method for operating a charging station is proposed. This charging station is provided for charging a plurality of electric vehicles. This involves, in particular, electric cars, which may also include buses and trucks as well as passenger vehicles. A charging station of this type can essentially be provided for charging other electric vehicles also, or the charging station may also be appropriate for other charging stations which do not charge electric cars. However, charging stations for electric cars play a particularly significant part here, since they are distributed locally throughout the country at places where, in some instances, nothing else is present which requires power or provides power. Charging stations of this type for electric cars furthermore also have a particular problem of having to cover sporadic and more or less unforeseen power peaks.

The charging station on which this method is based is connected at a grid connection point to an electrical supply grid. It is supplied with energy from the electrical supply grid via this grid connection point. In the simplest case, this can mean that charging power required in each case on a need-dependent basis is also removed as electrical power from the grid. However, it must also be borne in mind, for example if a precharging storage device is used, that the present charging power does not necessarily have to match exactly the power removed from the electrical supply grid. These powers can therefore differ temporarily from one another, but their energies summated over a longer period should match one another, wherein there are exceptions if, for example, further consumers of the charging station consume energy. One step of the method for operating the charging station accordingly entails drawing electrical energy from the electrical supply grid. One or more electric vehicles are then charged using this electrical energy drawn from the electrical supply grid. A plurality of electric vehicles are essentially charged simultaneously. Nevertheless, it cannot be excluded that only a single vehicle is sometimes charged. However, a large number of electric vehicles to be charged is essentially assumed.

For this purpose, it is now proposed that the charging station is controlled in such a way that the electrical supply grid is electrically supported. Not only is the charging power instantaneously required for charging drawn accordingly from the electrical supply grid, but the charging station also performs support tasks for the electrical supply grid.

Support tasks of this type are, in particular, those which provide a supportive response to excessive frequency fluctuations or voltage drops and do not simply remove power from the electrical supply grid in an uncontrolled manner in the sense of a parallel grid operation. Different support types and tasks will also be described below. One example will initially be mentioned, i.e., wherein a frequency support can be provided.

If, for example, the grid frequency drops, this is a sign that a power undersupply exists in the electrical supply grid, which can also be referred to here generally as the "grid" for simplification purposes. The energy-generating installations, i.e., the large power stations, but now also local feed-in installations, such as wind power installations or photovoltaic installations, normally respond to such grid behaviors. However, it is now proposed here that the charging station also participates in a grid support. For the mentioned example, this can mean that the charging station restricts the removal of electrical power.

The drawing of electrical energy is preferably controlled in such a way that the electrical supply grid is electrically supported. The electrical supply grid can also be supported by the charging station, for example, in such a way that additional power is removed and consumed in a consumer. However, the solution preferred here provides that the drawing of the electrical energy which is therefore ultimately required to charge the electric cars is controlled in such a way that the electrical supply grid is thereby electrically supported. This also includes, in particular, controlling the drawing of electrical energy in terms of its quality in such a way that the electrical supply grid is electrically supported.

This includes, in particular, the phase position with which the electrical energy or, considered instantaneously, the electrical power is drawn from the electrical supply grid. In the ideal case, a reactive power can thus be fed into or removed from the electrical supply grid without changing the amount of the drawn electrical power, i.e., the drawn active electrical power. A voltage support, in particular, can thereby be provided or underpinned.

It has therefore been recognized that a grid support can be provided even without a reduction in the active power removal. It has also been recognized that the problem that a charging station of this type requires a substantial amount of power simultaneously offers the opportunity or potential to be used to a considerable extent for the electrical support of the electrical supply grid also.

It is preferably proposed that the drawing of electrical energy is controlled depending on a grid state and furthermore or alternatively depending on a grid characteristic of the electrical supply grid. The drawing of electrical energy can thereby be controlled in such a way that a corresponding response can be provided to such detected grid states or grid characteristics. A grid state is to be understood here as a state variable of the electrical supply grid. This therefore relates, in particular, to instantaneous and dynamic variables and is to be understood, in particular, as a state in the control technology sense.

A grid characteristic is to be understood here as a characteristic which characterizes the grid as such.

A grid state is preferably a state of the electrical supply grid and may be a grid frequency, a grid frequency change, a grid voltage, a grid voltage change and a harmonic content of the grid voltage.

In particular, the drawing of active electrical power can be modified, at least temporarily, depending on the grid frequency. An active power removal can be reduced, particularly in the case of an excessively low frequency which is, for example, 0.3% or more below a nominal grid frequency.

The same action can be taken depending on a grid frequency change which ultimately helps to detect more quickly a frequency which is too high or too low. The removed active power can thus, for example, already be reduced if a substantial frequency drop is detected, even before an excessively low grid frequency is attained.

A grid voltage which is too high or too low can result, in particular, in a corresponding reactive power feed-in or removal or in a change in existing reactive power feed-in or removal. It is proposed, in particular, to feed capacitive reactive power into the electrical supply grid if the grid voltage falls below a predefined lower voltage limit value. Such reactive power can be fed in by removing electrical power from the electrical supply grid with a corresponding phase angle in relation to the grid voltage. The feed-in or removal of the reactive power can be controlled by setting this phase angle.

It is also conceivable here to consider a grid voltage change in order to be able to detect corresponding voltage deviations quickly. Particularly the consideration of grid voltage and grid voltage change can be combined.

A harmonic content of the grid voltage can similarly be detected and the quality of the electrical energy removals can be controlled depending thereon. The charging station will ultimately charge the electric vehicles with DC current or DC voltage. The electrical energy can be removed, in particular, by means of a controlled rectifier and the latter can also influence the harmonic content of the current removed by it. A filter can be provided, for example, on the rectifier, or the rectifier controls the rectification process accordingly. This can be achieved, for example, through the specific selection of the switching times of the controlled semiconductor switches or controlled diodes. It is provided, in particular, that the feed-in is performed with the lowest possible harmonic content if the harmonic content of the grid voltage is high.

The consideration and incorporation of these grid states can also be combined. Some combinations have also been mentioned already. However, a combination of a frequency-dependent control of the amount of removed active power with a grid-voltage-dependent control of the reactive power can also be considered, to mention but one example.

A grid characteristic is preferably a characteristic of the electrical supply grid, i.e., a grid sensitivity or a short circuit current ratio. A grid sensitivity is defined here, in particular, as a voltage response of the electrical supply grid at the grid connection point to a changed power removal of the charging station at the grid connection point. If the power removal of the charging station at the grid connection point is therefore changed, i.e., for example, is increased by 100 kW, this results in a voltage response, in particular a voltage reduction at the grid connection point, for example 100 V if the grid voltage is 10 kV. This ratio of this voltage reduction to the power increase, i.e., in the example 100 V/100 kW (=1 V/kW) can, for example, form the grid sensitivity. The grid sensitivity is therefore a measure of the response of the electrical supply grid, i.e., with reference to the grid connection point, to an active power change. The stronger the voltage response, the higher the grid sensitivity, i.e., the more sensitive the grid is.

According to one embodiment, the drawing of electrical energy is therefore controlled depending on this grid sensitivity. It is conceivable, in particular, that a control dynamic which controls the drawing of electrical energy has an increase which is dependent on the grid sensitivity. The greater the grid sensitivity, the smaller the increase can be chosen. The controller adjusts the removed power here to a reference value and the dynamic with which this takes place is modified by this increase. However, this is but one example and it is also conceivable to modify the general manner of such a control, i.e., for example, to set a damping, depending on the grid sensitivity.

A control can also be set depending on at least one grid state depending on the grid sensitivity. The dynamic of a frequency-dependent power control, for example, can be set depending on the grid sensitivity.

A short circuit current ratio is a ratio of a maximum short circuit current providable by the electrical supply grid at the grid connection point in relation to a nominal power removable by the charging station. A short circuit current ratio of this type therefore emanates from a short circuit event at the grid connection point. If a short circuit of this type occurs, there is a maximum short circuit current which can be provided by the electrical supply grid.

A short circuit current of this type is defined, in particular, by corresponding line capacities of the electrical supply grid in relation to relevant power feeders, i.e., by the corresponding line impedance. In this respect, the short circuit current ratio is also a characteristic which is related specifically to the grid connection point. This short circuit current is then set in relation to the nominal power of the charging station. In this respect, the nominal power of the charging station is the power which the charging station can remove. This is, on the one hand, obviously a value which is regularly certified, but is also physically defined, inter alia, by the characteristic, in particular, of the rectifier or bidirectional inverter with which the electrical power is removed from the electrical supply grid. The short circuit current ratio is thus also a grid characteristic which is related to the grid connection point and is therefore related to the size of the charging station. The higher a short circuit current ratio of this type is, the more powerful the electrical supply grid is.

It is proposed here, in particular, that a grid-state-dependent control or adjustment of the drawing of energy is set particularly sensitively if the short circuit current ratio is low. This is also but one example and other types of consideration in the controller is conceivable here also. However, it is also conceivable to specify a maximum current depending on the short circuit current ratio, or to specify a maximum ratio of reactive power to active power of the charging station.

It has been recognized that a short circuit current ratio, which can also be by a short circuit line ratio, can be particularly important in charging stations. In wind power installations or other local feeders at weak grid connection points (GCPs), a lower current results from a voltage increase due to the feed-in and this counteracts the voltage increase. Together with a voltage stabilization through reactive power feed-in, if an operation is performed at an upper edge of the voltage range, feed-in is still possible at very weak grid connection points (GCPs) also, particularly if the short circuit current ratio is less than 2 (SCR<2). A voltage support by a charging station, and therefore, in particular, also a voltage support by a consumer, is now proposed here.

It should be noted in this case that a lower voltage can mean a higher load current. This must be controlled in such a way that the voltage does not fall below a permissible range and the grid does not become unstable.

According to one embodiment, it is proposed that the drawing of electrical energy is controlled depending on specifiable reference values, particularly depending on one or more power values specifiable by means of an external signal. As a result, the charging station can also be used, particularly by a grid operator, for control purposes, in particular for controlling the stability of the electrical supply grid. Reference values can be specified by said grid operator or in some other way. This can relate, in particular, to the active power to be removed in each case. Reference values of this type can indicate an upper limit representing the maximum amount of active power which can instantaneously be removed. However if the charging station is capable of more variable division of its power because, for example, it has a precharging storage device or it has additional controllable consumers, the removed power can in each case be directly controlled or adjusted to a specifiable reference value of this type.

However, reference values of this type may also be reactive power reference values which are specified by the reactive power to be set. If an external signal is used to specify reference values of this type, the charging station can thereby be used by an external entity for the control. An external entity of this type may be a central controller and/or an intervention facility for the grid operator. In particular, the grid operator can specify active power reference values in order to thereby control a power management in the electrical supply grid. It can thus use the charging station, for example, to reduce power peaks.

According to one embodiment, it is proposed that the drawing of electrical energy is controlled in such a way that power, in particular active power, is drawn from the supply grid depending on the grid frequency. The charging station can participate directly and simply in a power control in the grid and therefore a corresponding support of the grid particularly by means of a frequency-dependent power control of this type.

It is preferably proposed that the charging station draws reactive power from the supply grid or feeds reactive power into the supply grid depending on a grid state and furthermore or alternatively depending on a specification by a grid operator of the supply grid. A charging station can thus also be used in a simple manner for the voltage support of the grid section to which it is connected. It has been recognized here also that a voltage control of this type by means of reactive power feed-in can be carried out or supplemented not only by generators, but also by consumers. It has been recognized, in particular, that a charging station can be suitable for this purpose because it can have a corresponding flexibility and because charging stations can be locally distributed throughout the country. Charging stations furthermore require at least one rectifier or similar devices to convert the AC voltage of the electrical supply grid into DC voltage to charge the electric vehicles. Each charging station therefore has a control means which can be used for a proposed grid support of this type.

It is preferably proposed that the charging station is prepared in order to cope with grid faults in the supply grid. This means, in particular, that the charging station remains connected to the supply grid in the event of a grid fault and removes or feeds electrical power from or into the supply grid depending on a grid state and/or depending on a specification by the grid operator. In the event of a grid fault in which, for example, the grid voltage drops substantially, a situation is thus avoided in which, in particular, the charging station simply disconnects from the grid, leaving the grid to its own devices, but instead still remains on the grid and can intervene for control purposes.

It is particularly advantageous for supporting the electrical supply grid in the event of a grid fault that the charging station can continue to be operated directly since it remains connected to the grid. Particularly since the charging station can be operated variably in terms of its power removal, it can be an important element in clearing a fault of this type also. If the fault has been so severe that the grid voltage has even collapsed, it is helpful in the grid restoration, i.e., when the grid voltage is restored once more by corresponding feeders, to have controllable consumers which can adjust their consumption according to the progress of the grid restoration.

Furthermore or alternatively, dealing with the grid fault in the supply grid means that the charging station is controlled in such a way that it draws as much power from the supply grid after the grid fault as it did immediately before the grid fault. The charging station is therefore controlled in such a way that it returns as quickly as possible to its former operating point. Particularly if the charging station has no external control facility, a specific operational state of the charging station can be specified as a result and can be set by the grid operator when the grid fault is cleared.

According to one embodiment, it is proposed that the charging station is controlled in such a way that it feeds electrical power from an electric storage device of the charging station into the electrical supply grid depending on a grid state and furthermore or alternatively depending on a specification by the grid operator. This variant requires such an electric storage device of the charging station and such an electric storage device may, for example, be a battery bank with various batteries. Such a storage device can be present in the charging station, for example as a precharging storage device, in order to charge electric cars, particularly at peak times, with more power than can be instantaneously removed from the electrical supply grid.

However, it is proposed here to use such an electric storage device, specifically for grid support, to feed electrical power, i.e., active electrical power, from the storage device into the supply grid. This can also be done, in particular, depending on a grid frequency if the latter actually falls below a specifiable lower frequency value below the nominal grid frequency. The already proposed variant to reduce the removed active power in such a case is thus still further improved. In the extreme case, the support area which the charging station has through the control of the active power can thereby be doubled. This doubling is achieved in that, without the facility to feed in active power, the control facility of the charging station lies within the range from no active power removal to maximum nominal active power removal. Assuming that the limitation on which the removable nominal active power is based is also a limitation for active power which can be fed in, this operating range can now be extended downward, i.e., from feeding in no active power to feeding in active power in the amount of the nominal active power of the charging station. The operating range then extends therefore from feeding in active power in the amount of the nominal active power to removing active power in the amount of the nominal active power.

It is preferably proposed that the charging station provides an instantaneous reserve depending on the grid frequency and, furthermore or alternatively, depending on a change in the grid frequency. For this instantaneous reserve provision, it is proposed that the charging station reduces the power instantaneously removed from the supply grid and/or feeds power from the electric storage device of the charging station into the supply grid. In particular, it is proposed here to provide the already explained support facilities of the grid through feed-in or removal of active power as an instantaneous reserve. An instantaneous reserve of this type relates to the case where an active power is fed in briefly and temporarily depending on the frequency or frequency change, i.e., particularly if the grid frequency is reduced. An instantaneous reserve of this type can contribute to the provision of support, particularly during brief grid events. Sudden power peaks which become evident in a frequency drop of this type can frequently occur, particularly due to a connection of heavy loads in the electrical supply grid. A brief support of, for example, 1 to 10 seconds, in most cases a maximum of 30 seconds, can suffice here. The reason why such a brief feed-in can suffice is, in particular, that many feeders cannot respond quickly enough to power peaks of this type. A part of the power requirement can be met in the short term by the instantaneous reserve thus made available and the slowly adjusting feeders then have more time to adjust this additional power requirement. It is also simultaneously achieved that the frequency drop turns out to be more moderate due to the provided instantaneous reserve, which in turn helps to avoid a control overreaction of more slowly adjusting energy feeders.

According to one embodiment, it is proposed that the charging station takes additional power from the supply grid depending on the grid frequency and/or a change in the grid frequency whereby the charging station increases the power instantaneously removed from the supply grid in order to store more power in the electric storage device of the charging station and/or whereby the charging station increases the power for charging the one or more electric vehicles.

It is therefore specifically proposed here to consume additional power from the supply grid depending on the grid frequency and to store it in a storage device or to increase the power in a targeted manner for charging the electric vehicles. The increase in the power instantaneously removed from the supply grid relates in this respect to the instantaneously removed power, i.e., particularly the power determined by the present instantaneous requirement of the electric vehicles which are intended to be charged. This operation of charging the electric vehicles determines a specific power which is removed from the electrical supply grid. However, precisely this power is now increased, i.e., particularly in the event of an increase in the grid frequency or if the grid frequency has already attained a predefined upper frequency limit value. This additionally removed power is in any case used appropriately here.

Furthermore or alternatively, it is proposed that this additional take of power from the supply grid is caused by the consumption of power in an additional consumer. In this respect, an additional consumer of this type is a consumer which, in particular, is not a vehicle to be charged, but a totally different consumer. An additional consumer of this type is one which can be controlled in a targeted manner in the described case, i.e., which can be controlled in a targeted manner to be the consumer of the power.

For this purpose, a chopper system is preferably proposed which guides electrical power in a targeted manner into a resistance arrangement comprising one or more electrical resistors in order to thereby consume this additional power in a thermal manner. In this respect, this chopper system represents the additional adjustable consumer and exclusively performs the function of consuming excess power. A situation of this type can be helpful particularly if a large consumer has been disconnected from the electrical supply grid and/or if a system split has taken place in which one part of the grid has been separated from another part of the grid. A grid separation of this type normally has the result that the power budgets in the two grid sections separated from one another are no longer balanced. A power oversupply can therefore then suddenly occur in the electrical supply grid or in the separated grid section. If this is the part of the electrical supply grid to which the charging station is also connected, the charging station can reduce this power oversupply by consuming power in a targeted manner. A situation of this type also occurs rarely and usually for a short time only. However, if it does occur, it is important to counteract it with a corresponding control in order to avoid the worst case of a grid collapse.

According to one advantageous embodiment, it is proposed that electrical power is removed from the supply grid for the drawing of electrical energy from the supply grid, and at least one change limit is specified for this removal of electrical power from the supply grid. A change limit of this type limits changes in the electrical power in terms of its speed of change. In other words, power edges are specified here which prevent the power from being changed too quickly. In particular, an excessively fast, in particular abrupt, power change can thereby be prevented. An abrupt power change of this type could occur if a new charging procedure for charging an electric vehicle is started in an uncoordinated manner such that the power required for this purpose is drawn directly from the supply grid. Very high currents and therefore very high powers can initially occur, particularly if an electric car is connected at a charging pole and a charging procedure is started. High peaks can occur here, particularly if electric vehicles, in particular electric cars, are intended to be charged with a fast-charging procedure.

The specification of the change limit, i.e., the specification of an edge with maximum steepness prevents charge peaks of this type from being passed on directly to the electrical supply grid. A change limit of this type can furthermore also take effect for a decreasing power.

A change limit of this type can be implemented, for example, in such a way that energy storage devices such as a precharging storage device temporarily store power peaks of this type. However, it is also conceivable for a specific charging procedure of an electric vehicle to be adapted. It is also conceivable for a power change limit of this type to be achieved, if necessary, by a correspondingly appropriate total control of all charging poles of charging stations. In particular, a high power peak can be prevented by avoiding a situation in which a plurality of charging procedures, in particular fast-charging procedures, start simultaneously for a plurality of cars.

A common limit gradient is preferably specified according to the amount, or an upper and a lower limit gradient. Both a temporal increase and a temporal decrease in the power can thereby be limited. In particular, it may be appropriate or desired according to the grid requirement for power increases and power decreases to have different strengths i.e., different speeds. This can be taken into account by using two limit gradients, i.e., an upper and a lower limit gradient.

It is therefore also preferably proposed that additionally required or less required power, in particular caused by the limiting of the speed of change of the removed power, is provided or taken by using the electric storage device of the charging station, by varying the charging power of the electric cars to be charged in each case and/or by controlling further consumers of the charging station. A control of further consumers of the charging station can also entail the control of an aforementioned chopper system.

The variation in the charging power of the electric vehicles to be charged in each case can also mean that the charging of a plurality of electric vehicles is coordinated accordingly. In one preferred coordination, a charging power peak of an electric vehicle can be compensated by adapting the charging power of electric vehicles which are already in the process of being charged.

This realization is based, in particular, on the case where many electric vehicles are connected to one charging pole and have already been undergoing charging for some time so that their initial charging current peak or charging power peak has already passed. If a new vehicle is then connected to a charging pole and is intended to be fast-charged, a charging power peak or charging current peak initially occurs there. In order to avoid passing this on to the electrical supply grid, the charging procedure for the remaining electric vehicles which have already been undergoing charging for some time can be reduced in each case by a small amount of current or power. The reduction is implemented, in particular, in such a way that the sum of all these smaller power reductions of the many connected electric vehicles corresponds in total to the additional charging requirement or the charging peak of the newly added electric vehicle. The charging peak is therefore distributed among the other vehicles which are already in the middle of the charging process.

According to one further embodiment, it is proposed that the drawing of electrical energy from the supply grid, the charging of electric vehicles and/or a control of further consumers of the charging station are controlled using a virtual storage device. A virtual storage device of this type takes account of power which the charging station can provide as charged storage capacity. In this respect, power which the charging station can provide is, in particular, power for charging electric vehicles and power for feeding into the supply grid. This virtual storage device furthermore takes account of power which the charging station can take as chargeable storage capacity. Power which it can take is, in particular, power which can be drawn from the supply grid.

A virtual storage device of this type thus combines providable and consumable power as storage capacity. The virtual storage device can, for example, initially originate from an actual electric storage device such as, for example, a precharging storage device and can take account of the energy contained therein as charged storage capacity. In addition, the power which can be drawn directly from the supply grid and can be used directly for charging the electric vehicles can also be included. This can be based, for example, on a timescale which can be determined, for example, by a typical charging time of an electric vehicle. This timescale may, for example, be 10 minutes or half an hour. The energy stored in the actual storage device can be supplemented for this purpose by the energy which can be drawn from the electrical supply grid for the timescale. The sum of these two energies then forms the charged storage capacity of the virtual storage device. This charged storage capacity of the virtual storage device is then available for charging the electric vehicles.

A calculation of this type can similarly be used for the purpose of feeding electrical power into the supply grid. The actually charged storage capacity or stored energy of an actual storage device can also be taken here as the starting point. An instantaneously used charging power with which electric vehicles are presently being charged can be subtracted therefrom, taking account of the timescale. At the same time, however, it can also be taken into account in this subtraction that a possible reduction in the present charging power comes into consideration in the case where power is intended to be fed into the electrical supply grid. The storage capacity of the virtual storage device is then once more increased slightly due to this value by which the present charging power can be reduced.

The virtual storage device can similarly be used in the case where the taking of power from the electrical supply grid is to be controlled. An actual storage device can be assumed here also. If said storage device is not yet fully charged, the energy quantity still required to fully charge it is a chargeable storage capacity. In addition, the charging station can take power from the grid in order to charge electric vehicles therewith. This can also be considered as chargeable storage capacity in the virtual storage device, taking account of the aforementioned timescale. A power quantity which can be consumed by means of one or more controllable consumers can also be included in the calculation of the chargeable storage capacity of the virtual storage device, taking account of the timescale.

The use of an actual storage device has been explained, in particular, by way of illustration. An actual storage device of this type is preferably also provided, but the virtual storage device can also be used if no actual storage device is present. Only the value of the storage capacity of an actual storage device would need to be set to the value of zero. The feeding of electrical power into the electrical supply grid would obviously be scarcely possible without an actual storage device, even if energy from the electric vehicles could theoretically be used. However, the remaining cases also get by more or less without an actual storage device. From the perspective of the grid, however, it is less relevant, or even irrelevant, whether power is fed in or is removed to a lesser extent. From the perspective of the grid, a shift in the power consumption has the same effect as a withdrawal from storage, i.e., a load reduction, and a subsequent addition to storage, i.e., a load increase.

The drawing of electrical energy from the supply grid, for example, can then be controlled on the basis of a virtual storage device of this type. In particular, the compliance with edges can be calculated on the basis of the virtual storage device or the storage capacity calculated for it. The charging of the electric vehicles can also take account of the virtual storage capacity available for that purpose. The amount of energy that is available can then be assessed purely on the basis of the virtual storage capacity.

The control of further consumers can also be simplified through the use of the virtual storage device. The power that is fed to a controllable consumer of this type can be taken into account in the virtual storage device as chargeable storage capacity. At the same time, a requirement for chargeable storage capacity can be taken into account and the consumer can then be controlled in such a way that the calculated chargeable storage capacity of the virtual storage device corresponds to a requirement for storage capacity.

A feed-in of electrical power into the supply grid can similarly be controlled using the virtual storage device. The amount of electrical power fed into the supply grid can simply be controlled on the basis of the charged storage capacity of the virtual storage device.

According to one embodiment, it is proposed that a maximum power to be removed from the supply grid is specifiable in a fixed or variable manner. A fixed specification is understood to mean that an essentially constant value is specified, but is set to a different value at a later time, for example on a different day or at a different time of the year. In particular, it is proposed that a fixed specification of this type is performed by means of an external signal, in particular by a grid operator. A grid operator can hereby set a correspondingly low limit value for the maximum power to be removed from the supply grid if, for example, capacity problems with the power supply are to be expected, or a grid bottleneck is present due to a failure of a resource.

A variable specification is, in particular, one which is defined depending on a grid characteristic and/or a grid state. This grid characteristic grid state can be detected and the maximum power to be removed from the supply grid can be specified via an algorithm. For example, a frequency-dependent specification of the maximum value is conceivable. Depending on the chosen functional relationship between the grid frequency and the maximum value, it is also conceivable for this maximum value to vary continuously as a result, albeit by small values only. However, if a deadband range is specified in a functional relationship of this type, which is proposed here as one embodiment, a variation in this maximum value can be omitted in the event of minor frequency changes, to continue with this example.

According to one further design, it is proposed that at least one operational state of at least one windfarm connected to the charging station or the same supply grid is taken into account and, furthermore or alternatively, the at least one windfarm is at least partially controlled by the charging station or by an overall controller superordinate to the charging station or to the at least one windfarm. It is thus proposed to take account of a windfarm and the charging station jointly, i.e., in particular to support the electrical supply grid. This relates only to a windfarm which, in terms of the topography of the electrical supply grid, is connected so close to the charging station that the charging station can influence the windfarm or at least the grid section to which the windfarm is connected. This can then create synergies if the charging station and the windfarm are coordinated with one another or can even be controlled together. It may be appropriate, for example in the case of a power oversupply in the electrical supply grid, to control the windfarm and the charging station in such a way that the windfarm is not initially restricted in its generation, but instead the charging station attempts to remove as much power as possible and, if necessary, store it temporarily in a precharging storage device. However, this is but one example and, as a further example, the windfarm can inform the charging station if a power collapse is imminent, for example due to an expected lull in the wind. It is also conceivable for power support to be divided between the windfarm and the charging station so that each unit has to provide only a part of a power support.

The charging station and the at least one wind form are preferably coordinated in order to control a power flow in the supply grid and/or to support a voltage regulation in the supply grid. This is one proposal, in particular, for counteracting a limited grid capacity also. Controlling a power flow in the supply grid can mean, in particular, that the feed-in by the windfarm, and particularly the removal by the charging station, are performed in such a way that power flows in the electrical supply grid are taken into account. It is particularly important here that said power flows do not exceed any limit values. However, it is also conceivable to perform or at least support a redistribution of power flows through suitable reactive power feed-in in a meshed grid.

It is preferably proposed to perform a voltage regulation in the supply grid by the windfarm and the charging station in a coordinated manner. This can similarly be done via a reactive power feed-in. This can be performed jointly by the windfarm and the charging station or can at least be carried out in such a way that an appropriate division between the charging station and the wind form is achieved.

A charging station is also proposed for charging a plurality of electric vehicles, in particular electric cars. A charging station of this type is connected at a grid connection point to an electrical supply grid in order to be supplied with electrical energy from the electrical supply grid via said grid connection point. It comprises an active rectifier or a bidirectional inverter for drawing electrical energy from the electrical supply grid. In this respect, an active rectifier is a rectifier which can also be controlled during rectification in order to be able to influence currents and voltages during the rectification. A bidirectional inverter is understood to mean an inverter which can invert not only from DC current or DC voltage into AC current or AC voltage, but also in the opposite direction, i.e., from AC current or AC voltage into DC current or DC voltage. A bidirectional inverter implementation essentially comprises an inverter and a rectifier which are more or less parallel-connected.

The charging station furthermore has a plurality of charging terminals, wherein each charging terminal is provided for charging one of the electric vehicles using the electrical energy drawn from the electrical supply grid. Charging terminals of this type can also be referred to as charging poles.

A central controller is furthermore provided to control the charging station, wherein the central controller is prepared in order to control the charging station in such a way that the electrical supply grid is electrically supported. This charging station is therefore not prepared in order to charge electric vehicles, but instead can also simultaneously provide a grid support. This can be controlled, in particular, with the central controller and can be implemented with the active rectifier or bidirectional inverter.

The charging station is preferably prepared in order to be operated according to at least one embodiment described above. In particular, the central controller is prepared in order to carry out a method according to at least one embodiment described above. All of the advantages that have been described above can therefore be achieved with the charging station also. It should be noted, however, that not every described functionality can be performed with an active rectifier alone. If the active rectifier alone cannot achieve a functionality of this type, such as, for example, the active feed-in of active electrical power, the bidirectional inverter or, if necessary, an additional element, in particular a feed-in-enabled inverter is proposed. A unit, i.e., particularly the bidirectional inverter, is preferably proposed for the described functionalities.

According to one embodiment, it is proposed that the charging station is in that it has at least one electrical storage device in order to store electrical energy temporarily therein. The electrical storage device can be designed, for example, as a storage bank with battery storage devices.

It is provided, in particular, in order to be able to take more power, if required, from the supply grid than is instantaneously required to charge electric vehicles, by means of the temporary storage. In this respect, the electric storage device can serve as a buffer. It can thereby also be achieved that the power removal from the supply grid can be equalized in order to thereby support the electrical supply grid also, i.e., in that power peaks can be avoided.

Furthermore or alternatively, the electric storage device is provided in order to use energy stored in the electric storage device if required so that more power is instantaneously removed from the supply grid than is temporarily provided for charging the electric vehicles. By means of the electric storage device, a response can therefore also be provided to a load peak for charging electric vehicles. A load peak of this type which cannot be drawn at the grid connection point of the charging station can be provided for charging the vehicles.

The electric storage device is also provided, in particular, to feed power into the supply grid. A support of the supply grid can also be undertaken particularly as a result thereof, making the feed-in of active power a necessity. In particular, it is provided for this purpose to use the electric storage device for those embodiments of the described methods outlined above which provide to feed electrical power into the supply grid.

According to one design, it is proposed that at least one further consumer is provided to consume power if required, particularly if more power is removed from the supply grid than is instantaneously required to charge electric vehicles. A consumer of this type can thus be provided, in particular, for grid support situations in which additional power has to be removed from the electrical supply grid to thus respond, in particular, to a power oversupply in the electrical supply grid.

The charging station, in particular the central controller, is preferably provided to control the at least one further consumer. A total control of the charging station can thus also control this controlled consumer and therefore also incorporate it into a control concept for the grid support.

The further consumer is preferably a chopper system which guides electrical power in a targeted manner into a resistance arrangement consisting of one or more electrical resistors in order to thereby consume the power thermally. A chopper system of this type can consume power particularly efficiently and easily controllably. This takes place particularly in such a way that the effective level of a current is controlled by means of a pulse width control. As a result, a power can also be guided in a targeted manner into the resistors particularly quickly and spontaneously and controllably in terms of its level for consumption. A chopper system of this type can be connected, for example, to an intermediate DC voltage circuit.

According to one variant, it is proposed that the consumer is a conversion device, in particular an electrolyzer, in order to convert electrical power into a different form of energy, in particular into a gas. Excess power is thus consumed from the perspective of the supply grid, but is fed to a further use, i.e., is converted, in particular, into gas. A conversion into hydrogen or into methane, for example, is conceivable.

According to a further embodiment, it is proposed that the charging station is coupled via a direct electric line for the exchange of electrical power or via the same supply grid to a windfarm, and is prepared in order to coordinate the control of the charging station with a control of the windfarm, at least with a control variable of the windfarm.

A coupling of this type between the charging station and a windfarm, wherein a plurality of charging stations and/or a plurality of windfarms can be provided for the coupling, is advantageous particularly if both the charging station and the windfarm are set up locally, but are set up close to one another. A direct energy transport from the windfarm to the charging station can then be achieved. This can supplement the essential energy withdrawal of the charging station, but can essentially provide it alone, particularly if sufficient electrical storage devices are present as buffers. One preferred coupling is carried out in such a way that the units to be coupled, i.e., the at least one windfarm and the at least one charging station, in each case have an intermediate DC voltage circuit and these intermediate DC voltage circuits are directly coupled. According to one design, only two or more charging stations are coupled to one another. As a result, said charging stations can exchange power directly with one another if required. That is appropriate particularly if one charging station is heavily utilized and the other is lightly utilized.

A lightly utilized charging station can preferably be used to feed more reactive power into the supply grid than a heavily utilized charging station, regardless of whether said charging stations are or are not directly coupled for the power exchange.

In addition, it is particularly advantageous if the charging station and windfarm are coupled to support the supply grid. In particular, they can advantageously be coordinated here so that a windfarm can provide support particularly through power feed-in, whereas a charging station can provide support particularly through power removal. A coordination can thus be provided so that support requirements, in particular, which necessitate a power feed-in are made available as first priority by the windfarm. The charging station can provide support if necessary. It can be provided accordingly that a support requirement in which electrical power has to be removed is carried out as first priority by the charging station. The windfarm can provide support here. Depending on the requirement for power feed-in or power removal to support the grid, a superordinate controller can establish whether the charging station or the windfarm or both perform this task. The superordinate controller can then coordinate or control this accordingly.

BRIEF DESCRIPTION OF THE SEVERAL VIEWS OF THE DRAWINGS

The invention is explained in detail below by way of example on the basis of embodiments with reference to the accompanying figures.

DETAILED DESCRIPTION

Figure 1:
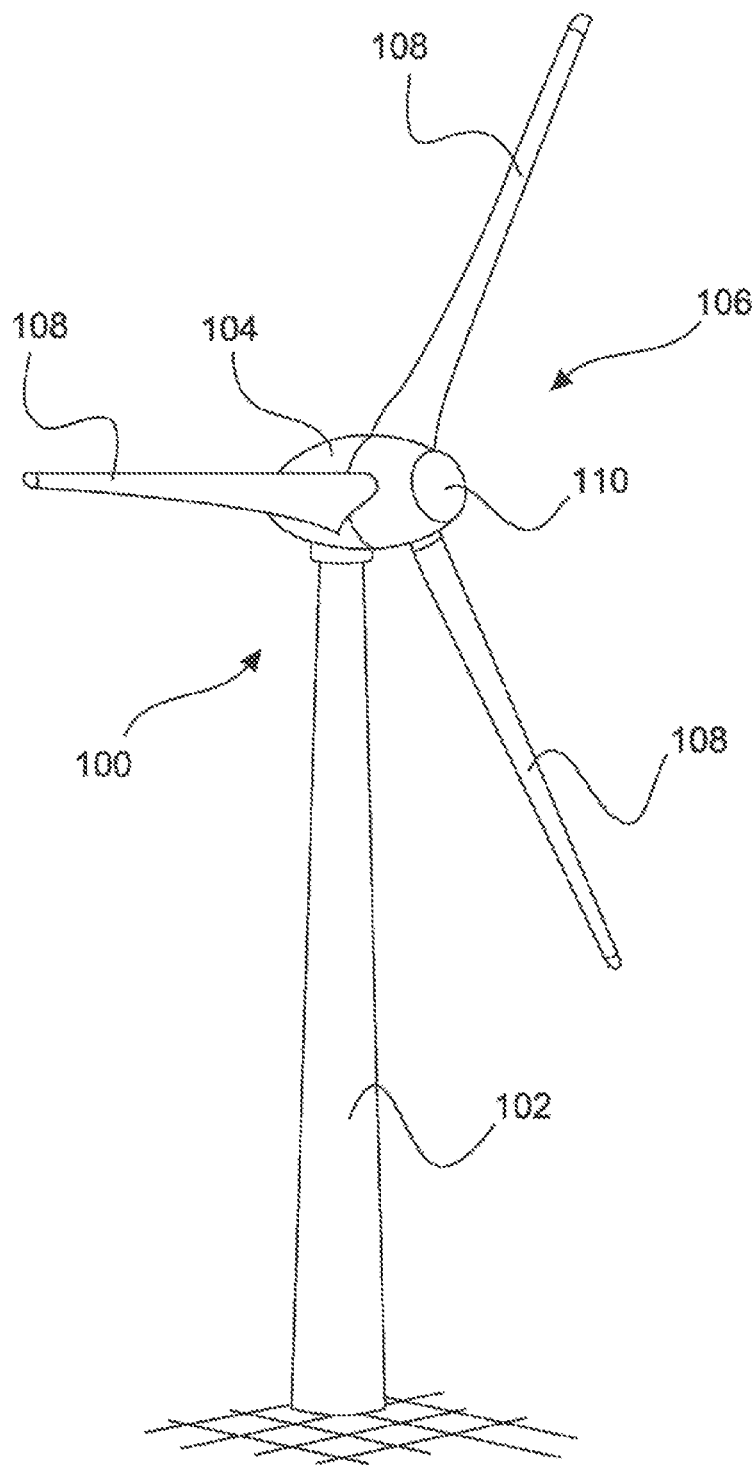
FIG. 1 shows a wind power installation in a perspective view.

FIG. 1 shows a wind power installation 100 with a tower 102 and a nacelle 104. A rotor 106 with three rotor blades 108 and a spinner 110 is disposed on the nacelle 104. The rotor 106 is set in rotational motion by the wind and thereby drives a generator in the nacelle 104.

Figure 2:
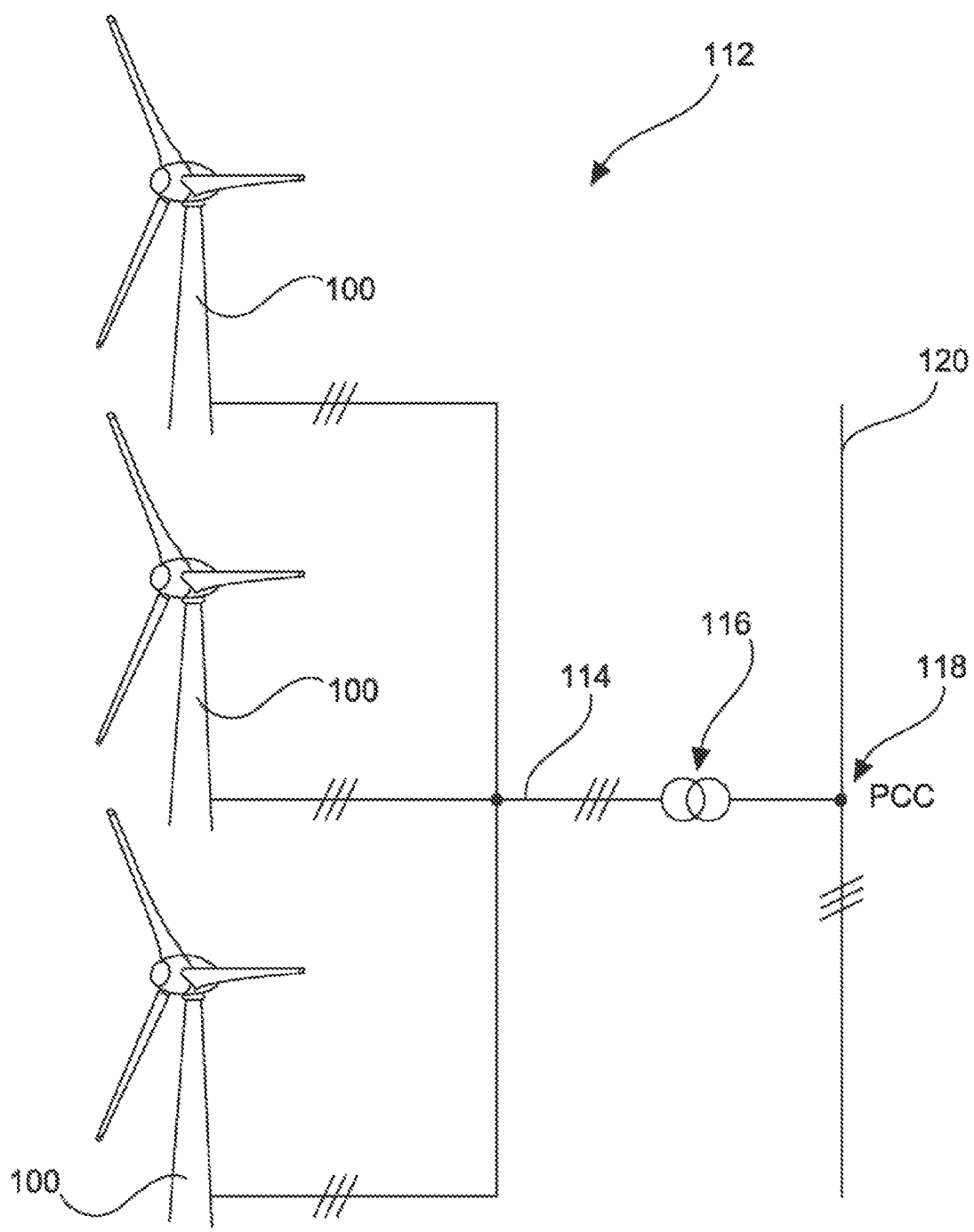
FIG. 2 shows a windfarm in a schematic view.

FIG. 2 shows a windfarm 112 with, by way of example, three wind power installations 100, which may be identical or different. The three wind power installations 100 thus represent essentially any number of wind power installations of a windfarm 112. The wind power installations 100 provide their power, i.e., in particular, the generated current, via an electrical windfarm grid 114. The currents or powers of the individual wind power installations 100 generated in each case are added together and a transformer 116 is usually provided to step up the voltage in the windfarm and then feed it at the feed-in point 118, which is also generally referred to as the PCC, into the supply grid 120. FIG. 2 is only a simplified representation of a windfarm 112 which, for example, shows no controller, although a controller is obviously present. The windfarm grid 114 can also, for example, be designed differently in that, for example, a transformer is also present at the output of each wind power installation 100, to mention but one other example embodiment.

Figure 3:
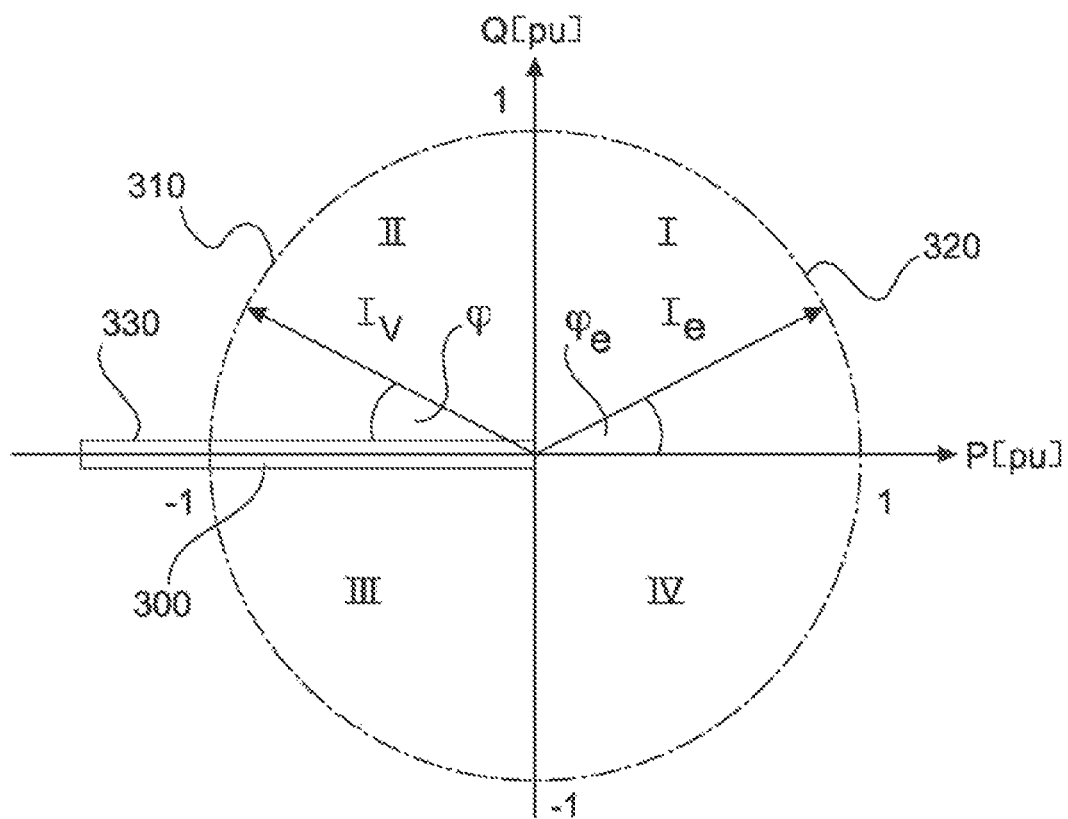
FIG. 3 shows an active-reactive power diagram divided into four quadrants.

The diagram in FIG. 3 shows for illustrative purposes an active-reactive power diagram for a power feed-in. The active power P is plotted on the x-axis and the reactive power Q is plotted on the y-axis. Standardized values are indicated as values, wherein the standardization can be based, for example, on the amount-related value of the nominal power of a charging station. However, the precise values are not relevant here in this illustration.

The diagram is intended to illustrate operating ranges at a charging station connected to an electrical supply grid. A charging station according to FIG. 3 can be used as a basis and will be described in detail below.

The range resulting from the use of an uncontrolled rectifier is designated as the uncontrolled range 300. In this case, the charging station would remove an active power P from the electrical supply grid by means of the uncontrolled rectifier, said active power corresponding, in particular, to the respectively present requirement. A charging station of this type this only removes active power whose amplitude fluctuates from zero to nominal power. Since the diagram in FIG. 3 has been chosen as a diagram of a feed-in, the range therefore extends from the value 0 to −1. It is plotted as a range around the x-axis, but is shown only for illustrative purposes. The theoretical value can essentially lie on the x-axis.

In any case, no reactive power is fed in or removed according to this uncontrolled range 300, so that this uncontrolled range 300 is essentially shown only as a path on the x-axis. This uncontrolled range 300 thus shows a range according to the prior art. However, this representation is also illustrative insofar as a reactive power component can be present during an uncontrolled operation also. The uncontrolled range 300 could then be shown as a straight line into the 2nd or 3rd quadrant.

If at least one controlled rectifier is now used and the charging station is controlled in such a way that the electrical supply grid is electrically supported, the charging station can be operated at least in the controlled range at the first stage 310. This controlled range at the first stage 310 is shown as a semicircle with a dotted-line boundary. It shows that the charging station can be operated in the second and third quadrant according to the chosen nomenclature of FIG. 3. The four quadrants shown are continuously numbered using Roman numerals.

According to this controlled range at the first stage 310, the charging station can thus be controlled not only in such a way that active power can be removed from the electrical grid, but also in such a way that reactive power can also be fed in or removed. The power or energy which is drawn from the electrical supply grid is removed with a removal current. The removal current can also be referred to as the consumption current. According to the first-stage controlled range, this removal current $I_V$ can have a phase angle φ in relation to the grid voltage, i.e., the electrical voltage in the electrical supply grid. If this phase angle φ has the value zero, only active power is removed and this would corresponds to the uncontrolled range 300. A situation of this type could also be described mathematically in such a way that the removal current $I_V$ corresponds to a feed-in current with a phase angle of −180° or +180°. However, the representation of a removal current $I_V$ has been chosen here for clearer illustration.

If this phase angle φ now has a value of −90° to +90°, it is located in the second or third quadrant and therefore in the controlled range at the first stage 310. This controlled range at the first stage 310 is shown here as a semicircle, i.e., under the idealizing assumption that the phase angle can assume the full 180°, i.e., from −90° to +90°, and under the assumption that it can attain, but cannot also exceed, this value which corresponds to the radius of the shown circle, for each phase angle.

However, with a phase angle which does not correspond to the value zero, it is also conceivable for the removal current $I_V$ to be greater. It is conceivable, for example, that only the active power has the shown restriction and an apparent power which is higher in terms of amount than the maximum active power can be fed in. In this case, an active power reduction does not necessarily have to take place with a non-zero phase angle φ.

However, with a phase angle of 90° or −90°, it is also conceivable that more full reactive power, i.e., reactive power with the amplitude standardized to the nominal power, cannot necessarily be fed in. In this case, the semicircle shown for illustrative purposes would not attain the value 1 or −1 for the controlled range at the first stage 310 on the y-axis.

In any case, FIG. 3 illustrates that the charging station can nevertheless feed in or remove a reactive power, even if it is prepared for active power removal only, by influencing the phase angle of the removal current $I_V$.

According to at least one design, an extension is proposed according to which the charging station can also be operated in a controlled range at a second stage 320. This second-stage controlled range is limited for illustrative purposes with a dotted-and-dashed line which similarly shows a semicircle. However, this is actually intended to be understood in such a way that the controlled range at the second stage 320 also comprises the controlled range at the first stage 310. The second-stage controlled range therefore comprises all four quadrants.

Such an extension of the charging station is achieved, in particular, through the use of an electric storage device which can also be referred to as a precharging storage device. It is therefore then also possible to feed active power into the electrical supply grid. Such a feed-in of active power is achieved by means of a feed-in current $I_e$. Such a feed-in current $I_e$ can have a phase angle $φ_e$. The feed-in current $I_e$ can essentially also be explained with reference to the removal current $I_V$ if its phase angle φ is extended onto a range from −180° to +180°. However, such a mathematically correct representation offers little clarity, so that the feed-in is based on the feed-in current $I_e$.

Active power can be fed in by the charging station even in this controlled range at the second stage 320. However, a reactive power feed-in or removal is furthermore possible in this range also, i.e., in the first and fourth quadrant. The circular shape is to be understood merely as an idealization for this controlled range at the second stage 320 also. However, this circular shape can nevertheless also represent an important specific application, particularly if the amount of the feed-in current $I_e$ is limited due to a current limitation, regardless of the chosen feed-in phase angle $φ_e$.

All four quadrants of the feed-in diagram shown in FIG. 3 can thus be covered with the controlled second-stage range. The charging station can thereby carry out a variety of support measures.

An extended active power range 330 which can be achieved by an additional consumer in the charging station is also indicated by way of illustration in FIG. 3. Such an extended active power range 330 thus enables the removal from the electrical supply grid of a power extending beyond the nominal power of the charging station if this is necessary for support purposes. However, this extended active power range 330 is also to be understood as illustrative and cannot obviously be attained if a current limitation of the grid connection point limits an active power removal to the nominal active power of the charging station, corresponding to the value −1 on the x-axis.

However, an increased active power removal by a consumer of this type can also be appropriate if the uncontrolled range 300 of the charging station cannot be fully exhausted because the charging station does not instantaneously have sufficient available power consumers, i.e., vehicles to be charged. In this case, the uncontrolled range 300 would not attain the value −1, but it could also be attained by the additional consumer. In this respect, FIG. 3 also illustrates the possibility that the controlled active power range 330 can be added to the uncontrolled range 300 according to the prior art in such a way that this combination then attains only the value −1.

Figure 4:
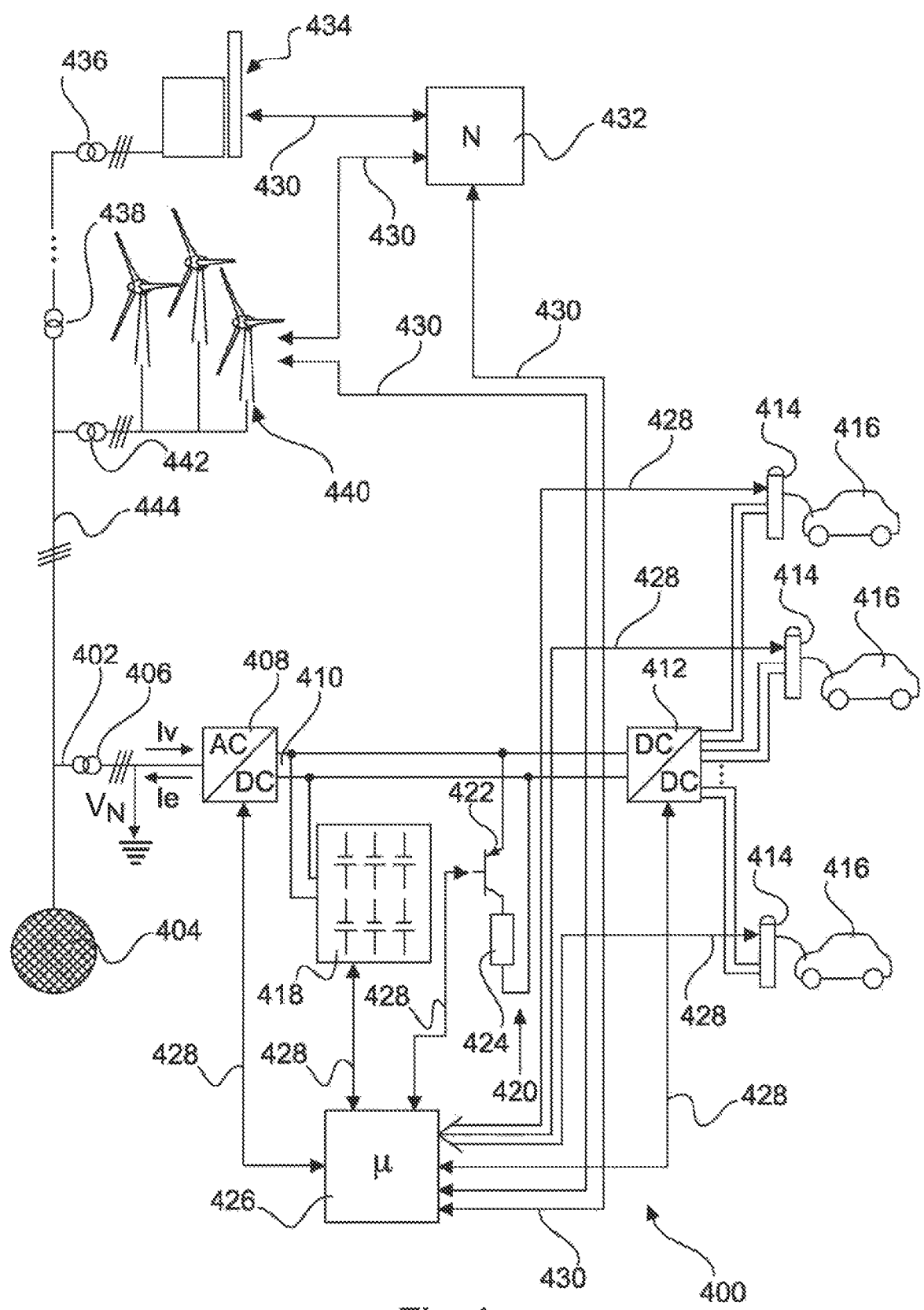
FIG. 4 shows schematically a charging station and parts of an electrical supply grid.

FIG. 4 shows schematically a charging station 400 which is connected via a grid connection point 402 to an electrical supply grid 404. This electrical supply grid 404 is shown here symbolically only and can also be referred to merely as a grid for the sake of simplicity.

The grid connection point 402 has a grid transformer 406. The charging station 400 draws electrical energy from the grid 404 via said transformer. This is essentially effected by means of a controlled power removal. The bidirectional inverter 408 is provided for this purpose. In normal operation, this bidirectional inverter 408 converts three-phase AC current from the supply grid 404 into a DC current. This DC current can be provided in an intermediate DC voltage circuit 410 which is indicated here as the output of the bidirectional inverter 408.

The electrical power removal can also be controlled via this bidirectional inverter 408 in such a way that the phase angle φ of a removal current $I_V$ can also be set in relation to the grid voltage $V_N$. The grid voltage $V_N$ is shown here for the sake of simplicity at a measuring point between the grid transformer 406 and the bidirectional inverter 408. A corresponding grid voltage of the electrical supply grid 404 on the other side of the grid transformer 406 is created accordingly by the transmission ratio of the grid transformer 406.

The bidirectional inverter 408 proposed here can furthermore also feed power into the electrical supply grid 404. The bidirectional inverter 408, which can also be referred to here merely as the inverter for the sake of simplicity, can thus generate a feed-in current $I_e$ opposed to the removal current $I_V$. Obviously, only the removal current $I_V$ or the feed-in current $I_e$ flows.

The fundamental purpose of the bidirectional inverter 408 is to draw electrical energy from the grid 404, i.e., by removing electrical power from the grid 404. This power is provided in the intermediate DC voltage circuit 410, i.e., essentially in the distributor circuit 412. The distributor circuit 412 is shown as a DC-DC converter in order to illustrate that it receives a DC current as input and forwards it to individual charging poles 414 according to requirements. Three charging poles 414 are shown by way of illustration, representing many charging poles 414. In each case, an electric vehicle 416 is intended to be charged presently at a charging pole 414. Obviously, it is essentially also conceivable that an electric vehicle 416 is not always connected to each charging pole 414.

The distribution by means of the distributor circuit 412 is similarly to be understood merely as illustrative and it is conceivable, for example, that each charging pole 414 on its own controls its charging controller and also an energy allocation available to it and a charging pole 414 of this type could also be connected in each case directly to the intermediate DC voltage circuit 410 for this purpose. However, a distributor circuit 412 of this type is preferably proposed which also performs a voltage reduction to the voltage level of an electric vehicle 416.

In addition to this distributor circuit 412 which supplies the charging poles 414, a battery bank 418 is also shown which can similarly be connected to the intermediate DC voltage circuit 410. This battery bank 418 is thus an electric storage device. It can serve as an energy buffer in order to balance load peaks due to the charging of the electric vehicles 416 so that load peaks, i.e., power peaks, of this type are not, or are not entirely, forwarded to the electrical supply grid 404. However, the battery bank 418, here representing an electric storage device, can also be used to feed electrical power into the electrical supply grid 404, i.e., by means of the feed-in current $I_e$. An operation in the first and fourth quadrant according to the diagram shown in FIG. 3 is therefore also possible by means of a battery bank 418 of this type.

A chopper system 420 is furthermore connected to the intermediate DC voltage circuit 410. For simplification, this chopper system 420 has a semiconductor switch 422 and a resistor 424. Power from the intermediate DC voltage circuit 410 can thus be consumed in the short term by this chopper system 420. The semiconductor switch 422 can be controlled in a pulsed manner for this purpose in order to guide current pulses from the intermediate DC voltage circuit 410 accordingly through the resistor 424. The resistor 424 becomes hot and can thereby consume the supplied power. The control of this chopper system 420 is provided, in particular, for a short-term power removal for grid support. The bidirectional inverter 408 can be controlled accordingly for this purpose in such a way that it removes the power to be consumed from the electrical supply would 404 and the chopper system 420 consumes said power or a proportion thereof as described.

In particular, a central controller 426 is provided to control the charging station 400. This central controller 426 essentially coordinates the corresponding elements of the charging station 400. By way of illustration, internal data transmission lines 428 are provided for this purpose which are denoted here in each case with the same reference number for the sake of simplicity in order to make it clear that this involves internal data transmission lines which transmit data within the charging station 400, i.e., in particular, in both directions, i.e., from the central controller 426 and to the central controller 426. The central controller 426 is thus connected in each case via an internal data transmission line 428 to the bidirectional inverter 408, the battery bank 418, the chopper system 420, each charging pole 414 and the distributor circuit 412.

The central controller 426 can accordingly control, in particular, the charging operation of the charging station 400, such as, if necessary, a charging power allocation for each charging pole 414, for example, and the corresponding removal of electrical power from the supply grid 404. However, the battery bank 418 can also be controlled for buffering and the power allocation can also be performed via a controller of the distributor circuit 412. Controllers of this type can, in particular, be combined. Additional data transmission lines can furthermore also be provided, such as, for example, between the charging poles 414 and the distributor circuit 412. Data transmission of this type can also be performed centrally via the central controller 426. However, other data network topologies for the communication within the charging station 400 are also conceivable.

However, it is proposed, in particular, that the central controller 426 controls the bidirectional inverter 408 in order to control a grid support if necessary as a result. Depending on the type of grid support, a corresponding control or control adaptation may be required within the charging station 400. It may be necessary, for example, to control the battery bank 418 if the bidirectional inverter 408 is intended to feed active power into the grid 404. If the power which is to be removed from the grid 404 is specified, a control of the chopper system 420 may possibly be required. An adapted control of the charging procedures of the electric vehicles 416 which are connected to the charging poles is also conceivable.

An external data transmission line 430 is furthermore provided in order to be able to take account of direct specifications by a grid operator also. An external data transmission line 430 of this type is shown here to a grid controller 432. However, this grid controller 432 can also represent a grid operator which operates the electrical supply grid 404. A grid operator of this type or the grid controller 432 can, for example, request an active power feed-in. In order to control this or further operations, the central controller 426 of the charging station 400 can also supply information concerning the external data transmission line 430 to the grid controller 432, indicating how much power capacity the charging station 400 and therefore the battery bank 418 in particular, actually has available. However, the grid controller 432 can, for example, also specify limit values. Such limit values may, for example, mean a maximum active power removal for the charging station 400, or a gradient limitation for the maximum change in an active power removal, to mention but two examples.

FIG. 4 furthermore illustrates a power station 434 which is connected via a power station transformer 436 to the electrical supply grid 404. By way of precaution, it should be noted that further transformers 438 can also be provided, but these are not relevant here. A further transformer 438 of this type is shown merely for illustration in order to make it clear that different voltage levels can also exist in the electrical supply grid 404.

In any case, the power station 434 can be provided as a conventional power station, such as, for example, a coal-fired power station or a nuclear power station. By way of illustration, a windfarm 440 is furthermore shown which is connected via a windfarm transformer 442 to the electrical supply grid 404. Both the conventional power station 434 and the windfarm 440 could similarly communicate via external data transmission lines 430 with the grid controller 432. It is furthermore provided for the windfarm 440 that said windfarm can communicate or exchange data directly with the central controller 426 and therefore with the charging station 400.

FIG. 4 is intended to illustrate, in particular, that the windfarm 440 and the charging station 400 are disposed essentially close to one another in the electrical supply grid 404. They also disposed on a grid section having the same voltage level. A correspondingly long distance to the power station 434 is also intended to be illustrated by corresponding dots between the further transformer 438 and the power station transformer 436.

The windfarm 440 is therefore disposed comparatively close to the charging station 400, in any case in relation to the connection between the charging station and the windfarm via a section of the electrical supply grid 404. This section is indicated here as the connection section 444 and designates the area between the windfarm transformer 442 and the grid transformer 406 of the charging station 400. However, a connection section of this type does not have to be provided as an immediate and direct connection line, but may also include further branches to other consumers or local feeders.

In any case, the charging station 400 and the windfarm 440 are so close to one another that the windfarm 440 can influence the voltage at the grid connection point 402 of the charging station 400. The charging station 400 can equally influence a voltage on the windfarm transformer 442.

With the knowledge of this proximity between the windfarm 440 and the charging station 400, it is now proposed that they are coordinated with one another, particularly in terms of a grid support. To do this, a communication between the windfarm 440 and the charging station 400 is provided which is illustrated here by an external data transmission line 430 to the central controller 426. A coordination of this type can also relate to the implementation of a request from a grid operator by the grid controller 432. If, for example, the grid operator thereby specifies a request for an active power reduction in the electrical supply grid 404, this active power reduction can be coordinated in such a way that the windfarm 440 feeds in a lesser proportion, for example half, thereof, and the charging station 400 removes an additional proportion, for example the remaining half, thereof.

However, a coordination is also conceivable for other tasks, such as, for example, a voltage regulation by means of reactive power feed-in. It can be provided here, in particular, that both the windfarm 440 and the charging station 400 perform a part of the required reactive power feed-in. This can offer the advantage that neither of the two, i.e., neither the windfarm 440 nor the charging station 400, has to control a very wide phase angle, which can be inefficient, but they can instead be divided so that they both feed in a part of the reactive power and in each case do not therefore have to control an excessively wide phase angle.

The invention claimed is:

1. A method comprising:
operating a charging station for charging a plurality of electric vehicles, wherein the charging station is coupled to an electrical supply grid at a grid connection point, wherein the charging station is configured to receive an electrical energy from the electrical supply grid via the grid connection point, wherein the operating comprises:
drawing electrical energy from the electrical supply grid, and
charging one or more electric vehicles using the electrical energy drawn from the electrical supply grid,
wherein the charging station is controlled in such a way that the electrical supply grid is electrically supported,
wherein the drawing of the electrical energy is controlled depending on at least one of: a grid state or a grid characteristic of the electrical supply grid,
wherein the grid state indicates at least one state of the electrical supply grid selected from the list comprising:
a grid frequency,
a grid frequency change,
a grid voltage,
a grid voltage change, and
a harmonic content of the grid voltage,
wherein the grid characteristic indicates at least one characteristic of the electrical supply grid selected from the list comprising:
a grid sensitivity defined as a voltage response of the electrical supply grid at the grid connection point to a changed power removal of the charging station at the grid connection point, and
a short circuit current ratio defined as a ratio of a maximum short circuit current providable by the electrical supply grid at the grid connection point in relation to a nominal power removable by the charging station.

2. The method as claimed in claim 1, wherein the drawing of the electrical energy is controlled in such a way that the electrical supply grid is electrically supported.

3. The method as claimed in claim 1, wherein the drawing of electrical energy is controlled depending on power values provided as reference values by one or more external signals.

4. The method as claimed in claim 1, wherein the drawing of the electrical energy is controlled in such a way that power is drawn from the supply grid depending on the grid frequency.

5. The method as claimed in claim 1 further comprising feeding reactive power from or into the supply grid depending on at least one of: a grid state or a specification by a grid operator of the supply grid.

6. The method as claimed in claim 1, further comprising:
maintaining the charging station coupled to the supply grid in an event of a grid fault, and removing or feeding electrical power from or into the supply grid depending on at least one of: a grid state or a specification by a grid operator,
wherein the charging station is controlled in such a way that the charging station draws as much power from the supply grid after the grid fault as the charging station drew immediately before the grid fault.

7. The method as claimed in claim 1, wherein the charging station is controlled in such a way that the charging stations feeds electrical power from an electric storage device of the charging station into the supply grid depending on at least one of: a grid state or a specification by a grid operator.

8. The method as claimed in claim 1, wherein the charging station provides an instantaneous reserve depending on at least one of: a grid frequency or a change in the grid frequency, wherein the charging station is configured to:
reduce power instantaneously removed from the supply grid, and
feed power from an electric storage device of the charging station into the supply grid.

9. The method as claimed in claim 8, further comprising:
drawing additional power from the supply grid depending on the grid frequency or the change in the grid frequency, wherein the charging station consumes the additional power from the supply grid, wherein:
the charging station increases the power instantaneously removed from the supply grid to store more power in the electric storage device of the charging station and increases the power to charge the one or more electric vehicles, and
consumes power in an additional consumer in a chopper system which guides electrical power in a targeted manner into a resistance arrangement comprising one or more electrical resistors that are configured to consume the power in a thermal manner.

10. The method as claimed in claim 9, wherein additionally or less required power is provided or taken by at least one measure from the list comprising:
- use of the electric storage device of the charging station,
- variation in charging power of the electric vehicle to be charged in each case, and
- control of further consumers of the charging station.

11. The method as claimed in claim 1, wherein the drawing of electrical energy from the supply grid comprises removing electrical power from the supply grid, the method further comprising:
- specifying at least one change limit to limit changes in the electrical power in terms of rate of change, such that at least one of: a common gradient, an upper limit gradient, or a lower limit gradient are specified to limit a temporal increate or a temporal decrease in the power.

12. The method as claimed in claim 1, wherein one or more of the following are controlled using a virtual storage device:
- the drawing of electrical energy from the supply grid,
- the charging of the electric vehicles,
- a control of further consumers of the charging station, and
- a feed-in of electrical power into the supply grid, wherein the virtual storage device takes account of:
- an amount of power the charging station is able to provide for charging the electric vehicles and for feed-in to the supply grid, as charged storage capacity, and
- an amount of power the charging station is able to take from the supply grid, as chargeable storage capacity.

13. The method as claimed in claim 1, wherein a maximum power to be removed from the supply grid is specifiable in a fixed or variable manner, wherein:
- a fixed specification is performed by an external signal by a grid operator, and
- a variable specification is performed depending on at least one of: the grid characteristic or the grid state.

14. The method as claimed in claim 1, wherein at least one of:
- at least one operational state of at least one windfarm coupled to the charging station or to the supply grid is taken into account, or
- the at least one windfarm is at least partially controlled by the charging station or by an overall control unit superordinate to the charging station and to the at least one windfarm.

15. The method as claimed in claim 1, wherein the charging station and at least one windfarm configured to at least one of:
- control a power flow in the supply grid, or
- support a voltage regulation in the supply grid.

16. A charging station for charging electric vehicles, wherein the charging station is configured to perform the method as claimed in claim 1.

17. A method comprising:
operating a charging station for charging a plurality of electric vehicles, wherein the charging station is coupled to an electrical supply grid at a grid connection point, wherein the charging station is configured to receive an electrical energy from the electrical supply grid via the grid connection point, wherein the operating comprises:
drawing electrical energy from the electrical supply grid, and
charging one or more electric vehicles using the electrical energy drawn from the electrical supply grid,
wherein the charging station is controlled in such a way that the electrical supply grid is electrically supported,
wherein the charging station provides an instantaneous reserve depending on at least one of a grid frequency or a change in the grid frequency, wherein the charging station is configured to:
reduce power instantaneously removed from the supply grid, and
feed power from an electric storage device of the charging station into the supply grid,
the method further comprising:
drawing additional power from the supply grid depending on the grid frequency or the change in the grid frequency, wherein the charging station consumes the additional power from the supply grid,
wherein the charging station increases the power instantaneously removed from the supply grid to store more power in the electric storage device of the charging station and increases the power to charge the one or more electric vehicles, and
wherein consumes power in an additional consumer in a chopper system which guides electrical power in a targeted manner into a resistance arrangement comprising one or more electrical resistors that are configured to consume the power in a thermal manner.

18. The method as claimed in claim 17, wherein additionally or less required power is provided or taken by at least one measure from the list comprising:
- use of the electric storage device of the charging station,
- variation in charging power of the electric vehicle to be charged in each case, and
- control of further consumers of the charging station.

* * * * *